No. 626,689. Patented June 13, 1899.
T. S. GRACE.
FASTENER FOR STRAPS, &c.
(Application filed Mar. 16, 1899.)
(No Model.) 2 Sheets—Sheet 1.
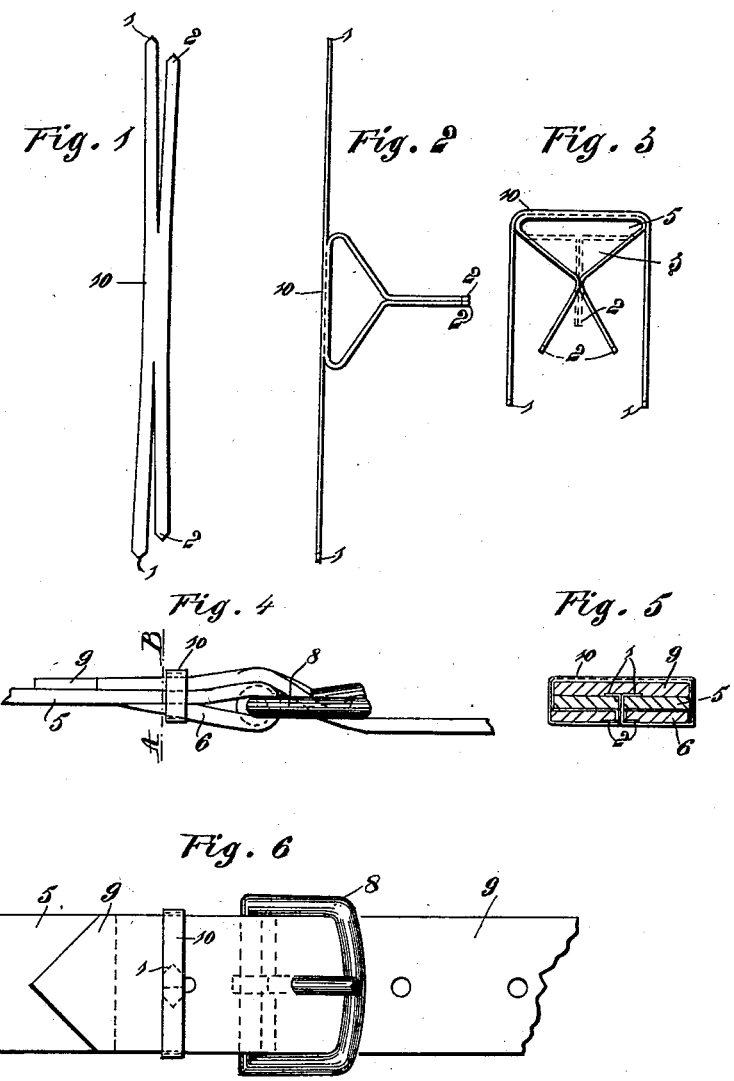

No. 626,689. Patented June 13, 1899.
T. S. GRACE.
FASTENER FOR STRAPS, &c.
(Application filed Mar. 16, 1899.)
(No Model.) 2 Sheets—Sheet 2.
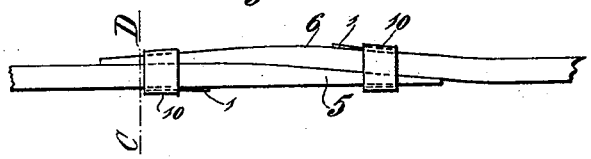
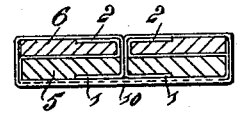
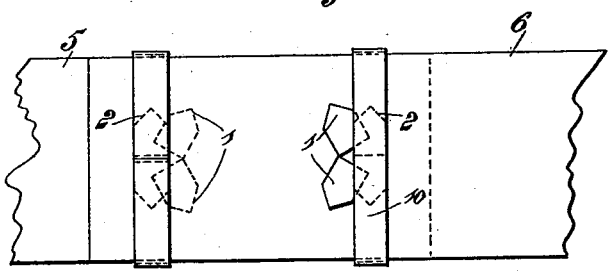
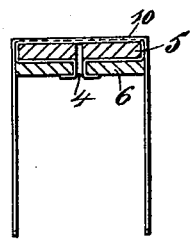
Witnesses:
Inventor:
Thomas Samuel Grace
By Richardson
his Attorneys.

UNITED STATES PATENT OFFICE.

THOMAS SAMUEL GRACE, OF BLENHEIM, NEW ZEALAND.

FASTENER FOR STRAPS, &c.

SPECIFICATION forming part of Letters Patent No. 626,689, dated June 13, 1899.

Application filed March 16, 1899. Serial No. 709,380. (No model.)

*To all whom it may concern:*

Be it known that I, THOMAS SAMUEL GRACE, a subject of the Queen of Great Britain, residing at Blenheim, New Zealand, have invented an Improved Fastener for Buckles, Straps, and the Like, of which the following is a specification.

This invention relates to fasteners for buckles and for uniting straps, belts, and the like;
and the object of the invention is to provide a simple and inexpensive device which may be easily and quickly applied as a buckle-fastener and for joining straps and the like in a secure and durable manner.

The fastener is made of ductile sheet metal, such as copper or other malleable metal, and is stamped or cut out to the required form and afterward bent into shape, adjusted upon the straps, and doubly clenched.

The appended drawings illustrate the invention, and reference will now be made thereto for purposes of a detailed description.

Figure 1 shows the metal stamped out ready for bending. Fig. 2 represents the plate partly bent. Fig. 3 illustrates the fastener ready for use and showing by dotted lines one strap inserted. Fig. 4 is a view of a strap and buckle with the fastener in position. Fig. 5 is a section on line A B, Fig. 4. Fig. 6 is a plan of the same. Fig. 7 is a view of the fasteners uniting the ends of a strap. Fig. 8 is a section on line C D, Fig. 8. Fig. 9 is a plan of the same. Fig. 10 is a section showing the straps in position to receive the outer strips.

Similar figures of reference indicate corresponding parts throughout the several views.

Referring to the drawings, the fastener is made by stamping or cutting a piece of sheet metal with strips 1 and 2, shaped as shown by Fig. 1, bending the same into the shape shown by Fig. 2 and finally as shown by Fig. 3, when it is ready to receive the straps. One end of the strap 5 is inserted in the space 3, Fig. 3, and the strips 2 forced down upon the same with their ends erect, as shown by dotted lines. The other end 6 of the strap is passed upon the said erect ends 2, which are then cut off and clenched, as shown by Fig. 10. After passing through the space 4, Fig. 10, between the strips 2 and through the strap 5, the ends of strips 1 are cut off and clenched, as shown by Fig. 8. In emerging from the strap the said ends of strips 1 are led out sidewise, as shown by Fig. 9, so that they will pass by the body 10 of the fastener and enable the operator to obtain a hold and draw the said ends through the strap.

Figs. 4, 5, and 6 show the device used as a fastening for attaching the strap 5 to the buckle 8 and as a keeper for the end 9 of the said strap. A fastener and keeper of this description are made in a manner similar to that just described, with the exception that another thickness 9 of strap, Fig. 5, is inserted in the space 3, Fig. 3, and retained there until the clenching of the ends 2 is accomplished. (See Fig. 5.) The thickness 9 of strap is then withdrawn, so that the clenching of ends 1 may be effected within the loop formed by the said thickness 9. The straps are pierced, as required, to admit the strips 1 and 2, and any suitable tool may be used for the purpose. The clenching of the said strips may be accomplished by means of a pair of pliers.

From this description and by reference to the drawings it will be seen that as the fastener is doubly clenched and the ends 2 are entirely and the ends 1 partially covered by the body 10 of the fastener a very strong and reliable device is produced for securing together straps and the like.

Having now particularly described and ascertained the nature of my said invention and in what manner the same is to be performed, I declare that what I claim is—

1. In combination, the strap-sections and the fastener having two pairs of strips formed integral therewith one of said pairs extending through an opening and clenched against the face of one strap-section and the other pair of strips being passed in the opposite direction through the strap-sections and clenched against the other face of the sections, substantially as described.

2. In combination, the strap-sections and the fastener having two pairs of strips formed integral therewith, one of said pairs extending through an opening and clenched against the face of one strap-section and the other pair of strips being passed in the opposite direction through the strap-sections and clenched against the other face of the sections, the main portion of the fastener being located at a distance from the strap-sections to form a keeper, substantially as described.

3. In combination, the strap-sections and a fastener having two pairs of strips one passing between the sections out through an opening in one of them and clenched against the outer side and the other pair passing around the sections and thence through them and clenched on the side opposite to that upon which the first pair is clenched, substantially as described.

Signed at Wellington, New Zealand, this 2d day of February, 1899.

THOMAS SAMUEL GRACE.

Witnesses:
E. S. BALDWIN,
S. T. SILVER.